(12) United States Patent
Hung

(10) Patent No.: US 8,855,178 B2
(45) Date of Patent: Oct. 7, 2014

(54) SIGNAL TRANSMITTER AND SIGNAL TRANSMITTING METHOD FOR TRANSMITTING SPECIFIC DATA BIT WITH DIFFERENT PREDETERMINED VOLTAGE LEVELS

(75) Inventor: Tzu-Li Hung, Kaohsiung (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 96 days.

(21) Appl. No.: 13/409,120

(22) Filed: Mar. 1, 2012

(65) Prior Publication Data

US 2013/0058389 A1  Mar. 7, 2013

Related U.S. Application Data

(60) Provisional application No. 61/448,311, filed on Mar. 2, 2011.

(51) Int. Cl.
| | |
|---|---|
| *H04B 3/46* | (2006.01) |
| *H04W 52/28* | (2009.01) |
| *H04L 25/02* | (2006.01) |
| *H04W 52/52* | (2009.01) |
| *H04L 25/49* | (2006.01) |

(52) U.S. Cl.
CPC ......... *H04L 25/0264* (2013.01); *H04W 52/281* (2013.01); *H04W 52/52* (2013.01); *H04L 25/028* (2013.01); *H04L 25/4904* (2013.01); *H04L 25/49* (2013.01)
USPC .......................................................... 375/224

(58) Field of Classification Search
USPC .................. 375/224, 229, 295, 296, 227, 316
See application file for complete search history.

(56) References Cited

U.S. PATENT DOCUMENTS

| | | | | |
|---|---|---|---|---|
| 6,542,555 | B2 * | 4/2003 | Dally | 375/296 |
| 7,099,404 | B2 * | 8/2006 | Dally | 375/296 |
| 7,443,211 | B2 * | 10/2008 | Liu | 327/108 |
| 7,466,787 | B1 * | 12/2008 | Ross | 375/376 |
| 7,483,508 | B2 * | 1/2009 | Staszewski et al. | 375/376 |
| 7,580,474 | B2 * | 8/2009 | Dally | 375/295 |
| 7,583,753 | B2 * | 9/2009 | Okamura | 375/296 |
| 7,602,857 | B2 * | 10/2009 | Dally | 375/295 |
| 7,602,858 | B2 * | 10/2009 | Dally | 375/296 |
| 7,656,939 | B2 * | 2/2010 | Gondi et al. | 375/229 |
| 7,668,276 | B2 * | 2/2010 | Hampel et al. | 375/371 |
| 7,715,494 | B2 * | 5/2010 | Dally | 375/296 |
| 7,839,955 | B2 * | 11/2010 | Hidaka | 375/316 |
| 8,023,584 | B2 * | 9/2011 | Zerbe et al. | 375/285 |
| 8,254,491 | B2 * | 8/2012 | Dally | 375/295 |
| 8,374,227 | B2 * | 2/2013 | Moll | 375/224 |
| 8,427,188 | B2 * | 4/2013 | Iwamoto | 324/762.01 |
| 2004/0124888 | A1 * | 7/2004 | Radelinow | 327/65 |
| 2004/0234014 | A1 * | 11/2004 | Chen | 375/350 |

(Continued)

*Primary Examiner* — Daniel Washburn
*Assistant Examiner* — Berhanu Tadese
(74) *Attorney, Agent, or Firm* — Winston Hsu; Scott Margo

(57) ABSTRACT

An exemplary signal transmitter includes a checking circuit and a driving circuit. The checking circuit is arranged for checking a plurality of successive data bits to be transmitted and accordingly generating a checking result. The driving circuit is arranged for referring to the checking result and transmitting a specific data bit with a plurality of different predetermined voltage levels. An exemplary signal transmitting method includes: checking a plurality of successive data bits to be transmitted, and accordingly generating a checking result; and transmitting a specific data bit with a plurality of different predetermined voltage levels according to the checking result.

20 Claims, 11 Drawing Sheets

(56) References Cited

U.S. PATENT DOCUMENTS

| | | |
|---|---|---|
| 2005/0093580 A1* | 5/2005 | Baig et al. .................. 327/65 |
| 2006/0034358 A1* | 2/2006 | Okamura .................. 375/219 |
| 2006/0238237 A1* | 10/2006 | Clements et al. ............ 327/557 |
| 2007/0139086 A1* | 6/2007 | Liu .................. 327/108 |
| 2007/0280390 A1* | 12/2007 | Hidaka .................. 375/350 |
| 2008/0192814 A1* | 8/2008 | Hafed et al. .................. 375/224 |
| 2010/0266006 A1* | 10/2010 | Werner et al. .................. 375/232 |
| 2012/0182043 A1* | 7/2012 | Dang et al. .................. 326/21 |

* cited by examiner

SIGNAL TRANSMITTER AND SIGNAL TRANSMITTING METHOD FOR TRANSMITTING SPECIFIC DATA BIT WITH DIFFERENT PREDETERMINED VOLTAGE LEVELS

CROSS REFERENCE TO RELATED APPLICATIONS

This application claims the benefit of U.S. provisional application No. 61/448,311, filed on Mar. 2, 2011 and incorporated herein by reference.

BACKGROUND

The disclosed embodiments of the present invention relate to transmitting signals from a signal transmitter to a signal receiver, and more particularly, to a signal transmitter and signal transmitting method capable of improving the signal transmission quality by transmitting a specific data bit with different predetermined voltage levels.

Signal transmission between a signal transmitter and a signal receiver generally suffers from signal attenuation/loss. As a result, the signal reception quality at the signal receiver may be degraded due to the unavoidable signal attenuation/loss resulting from a transmission medium (e.g., a transmission line) between the signal transmitter and the signal receiver. Recently, the electronic devices achieve greater data throughput by using a higher data rate (i.e., a faster transmission clock), which necessitates a solution for preventing the transmitted signal from being attenuated/distorted by the transmission medium. Thus, to improve the signal transmission quality, the signal transmitter is required to have the signal processing capability of dealing with the unavoidable signal attenuation/loss.

SUMMARY

In accordance with exemplary embodiments of the present invention, a signal transmitter and signal transmitting method capable of improving the signal transmission quality by transmitting a specific data bit with different predetermined voltage levels are proposed to solve the aforementioned problems.

According to a first aspect of the present invention, an exemplary signal transmitter is disclosed. The exemplary signal transmitter includes a checking circuit and a driving circuit. The checking circuit is arranged for checking a plurality of successive data bits to be transmitted and accordingly generating a checking result. The driving circuit is arranged for referring to the checking result and transmitting a specific data bit with a plurality of different predetermined voltage levels.

According to a second aspect of the present invention, an exemplary signal transmitting method is disclosed. The exemplary signal transmitting method includes: checking a plurality of successive data bits to be transmitted, and accordingly generating a checking result; and transmitting a specific data bit with a plurality of different predetermined voltage levels according to the checking result.

According to a third aspect of the present invention, an exemplary signal transmitter is disclosed. The exemplary signal transmitter includes a checking circuit and a driving circuit. The checking circuit is arranged for concurrently checking a plurality of successive data bits to be transmitted and accordingly generating a checking result, wherein a number of the successive data bits is larger than two. The driving circuit is arranged for referring to the checking result and transmitting at least a specific data bit with a specific voltage level, wherein the specific voltage level is different from a nominal voltage level for transmission of the specific data bit.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

The concept of the present invention is to apply compensation upon the transmission signal at the transmitter side before the transmission signal is transmitted to the receiver side. For example, regarding a digital signal transmission interface, the signal transmitter is used to receive data bits to be transmitted, and then outputting the data bits to the signal receiver in terms of voltage levels. Therefore, one compensation scheme is to adjust a voltage level representative of a data bit which may be attenuated during the transmission path between the signal transmitter and the signal receiver. Please refer to FIG. 1, which is a diagram illustrating a transmitter output generated by a first compensation scheme according to an exemplary embodiment of the present invention.

Figure 1:
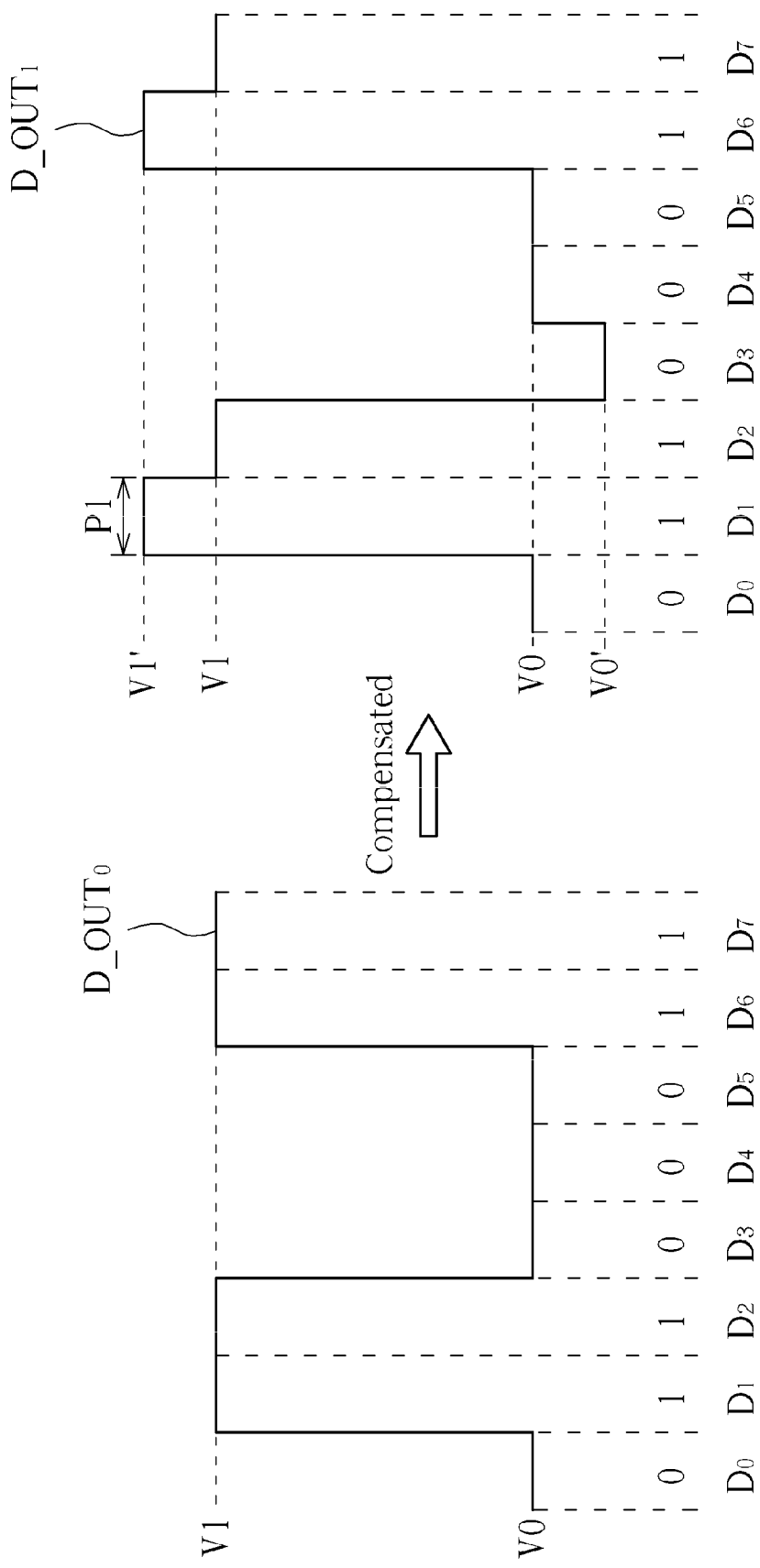
FIG. 1 is a diagram illustrating a transmitter output generated by a first compensation scheme according to an exemplary embodiment of the present invention.

As shown in FIG. 1, when no compensation is present, the signal transmitter transmits a data bit with a binary value "0" where such a data bit (i.e., "0") has one nominal voltage level V0, and transmits a data bit with a binary value "1" where such a data bit (i.e., "1") has another nominal voltage level V1. Hence, when the signal transmitter transmits a bit sequence $D_0D_1D_2D_3D_4D_5D_6D_7$="01100011", the transmitter output $D\_OUT_0$ would have the exemplary voltage waveform as shown in FIG. 1. As the high-frequency component included in the transmitter output is more subject to signal attenuation, the first compensation scheme is employed for applying compensation to the high-frequency component. Specifically, the level transition from a logic high level to a logic low level and the level transition from a logic low level to a logic high level are regarded as high-frequency components due to sudden voltage change. Thus, two successive data bits (e.g., a current data bit that is not transmitted yet and a previous data that has been transmitted) are compared to identify the occurrence of the transition edge.

As shown in FIG. 1, one transition edge is found by comparing successive data bits $D_1$ and $D_0$ having different binary values, another transition edge is found by comparing successive data bits $D_3$ and $D_2$ having different binary values, and yet another transition edge is found by comparing successive data bits $D_6$ and $D_5$ having different binary values. The signal transmitter employing the first compensation scheme would transmit the data bits $D_1$ and $D_6$ each having one boosted voltage level V1' (i.e., V1'>V1), and transmit the data bit $D_3$ having one degraded voltage level V0' (i.e., V0'<V0). Hence, when the signal transmitter transmits a bit sequence $D_0D_1D_2D_3D_4D_5D_6D_7$="01100011", the compensated transmitter output $D\_OUT_1$ would have the exemplary voltage waveform as shown in FIG. 1. The boosted voltage level V1'/degraded voltage level V0' would last in the unit of one bit time P1. As a result, the implementation of the first compensation scheme is required to match the data rate of data bits transmitted from the signal transmitter.

Alternatively, the compensation applied to the high-frequency component may be realized without following the data rate of data bits transmitted from the signal transmitter. Please refer to FIG. 2, which is a diagram illustrating a transmitter output generated by a second compensation scheme according to an exemplary embodiment of the present invention. The signal transmitter employing the second compensation scheme would transmit the data bits $D_1$ and $D_6$ each having a plurality of different predetermined voltage levels, such as one nominal voltage level V1 and one boosted voltage level V1', and transmit the data bit $D_3$ having a plurality of different predetermined voltage levels, such as one nominal voltage level V0 and one degraded voltage level V0'.

Figure 2:
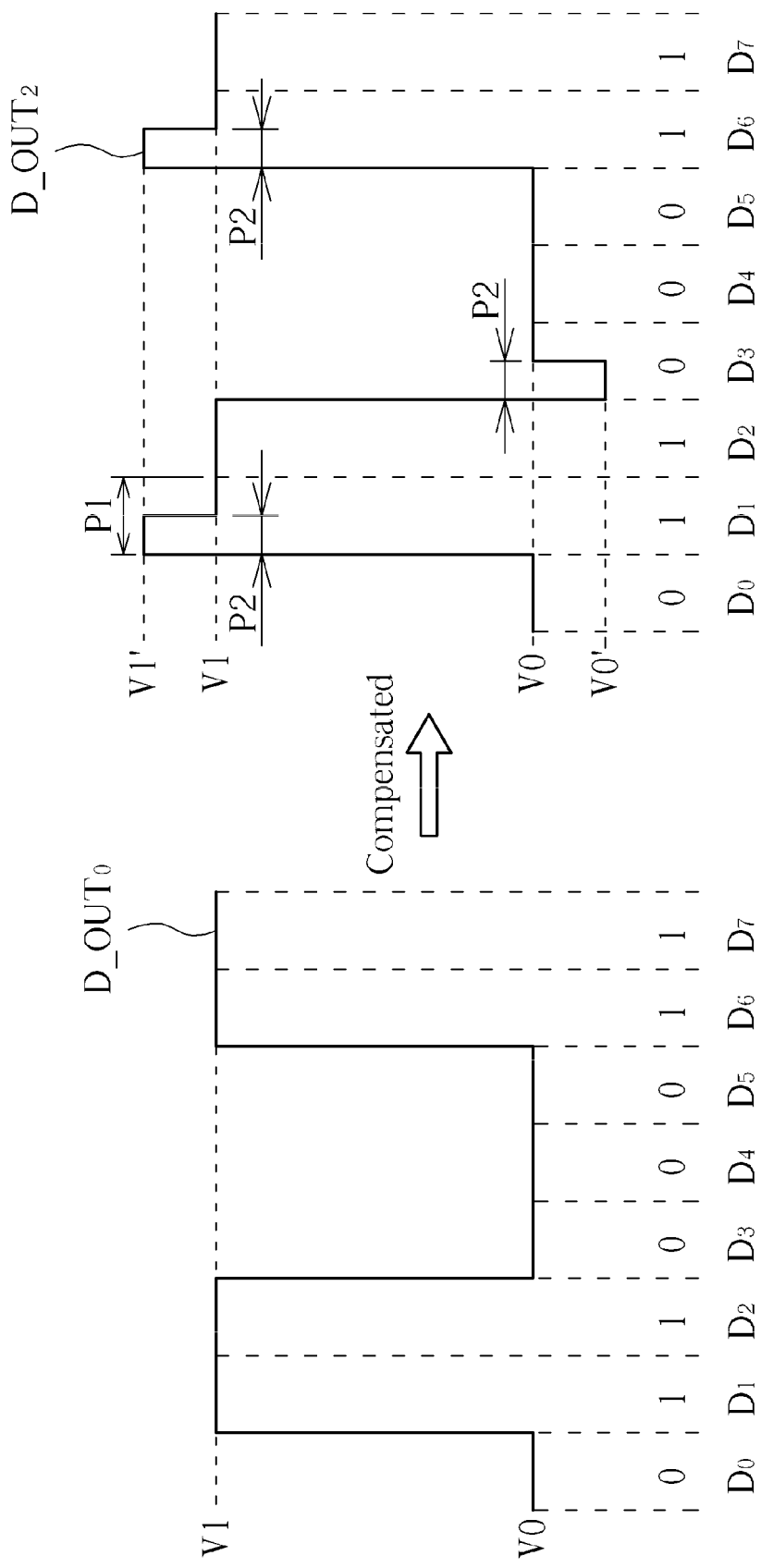
FIG. 2 is a diagram illustrating a transmitter output generated by a second compensation scheme according to an exemplary embodiment of the present invention.

Hence, when the signal transmitter transmits a bit sequence $D_0D_1D_2D_3D_4D_5D_6D_7$="01100011", the compensated transmitter output $D\_OUT_2$ would have the exemplary voltage waveform as shown in FIG. 2. The boosted voltage level V1'/degraded voltage level V0' would last during a time period P2 which is shorter than one bit time P1 (i.e., P2<P1). That is, based on the second compensation scheme, each of the data bits $D_1$ and $D_3$ is partially pre-emphasized (boosted/enhanced) for applying compensation to the beginning signal component with a comparatively higher frequency without affecting the following signal component with a comparatively lower frequency, and the data bit $D_3$ is partially de-emphasized (degraded/attenuated) for applying compensation to the beginning signal component with a comparatively higher frequency without affecting the following signal component with a comparatively lower frequency. As can be readily seen from FIG. 2, the implementation of the second compensation scheme is not required to follow the data rate of data bits transmitted from the signal transmitter. Besides, the same objective of applying compensation to the high-frequency component included in the transmitted signal is achieved.

In the following, several exemplary hardware implementations of a signal transmitter are provided for illustration of technical features of the present invention. For example, the proposed signal transmitter may be employed in a signal transmission interface, such as a high-speed digital signal transmission interface (e.g., a Serializer/Deserializer (SerDes) interface), and is capable of outputting pre-emphasized/de-emphasized data bits to compensate the signal attenuation/loss caused by a transmission line connected between the signal transmitter and the signal receiver.

Figure 3:
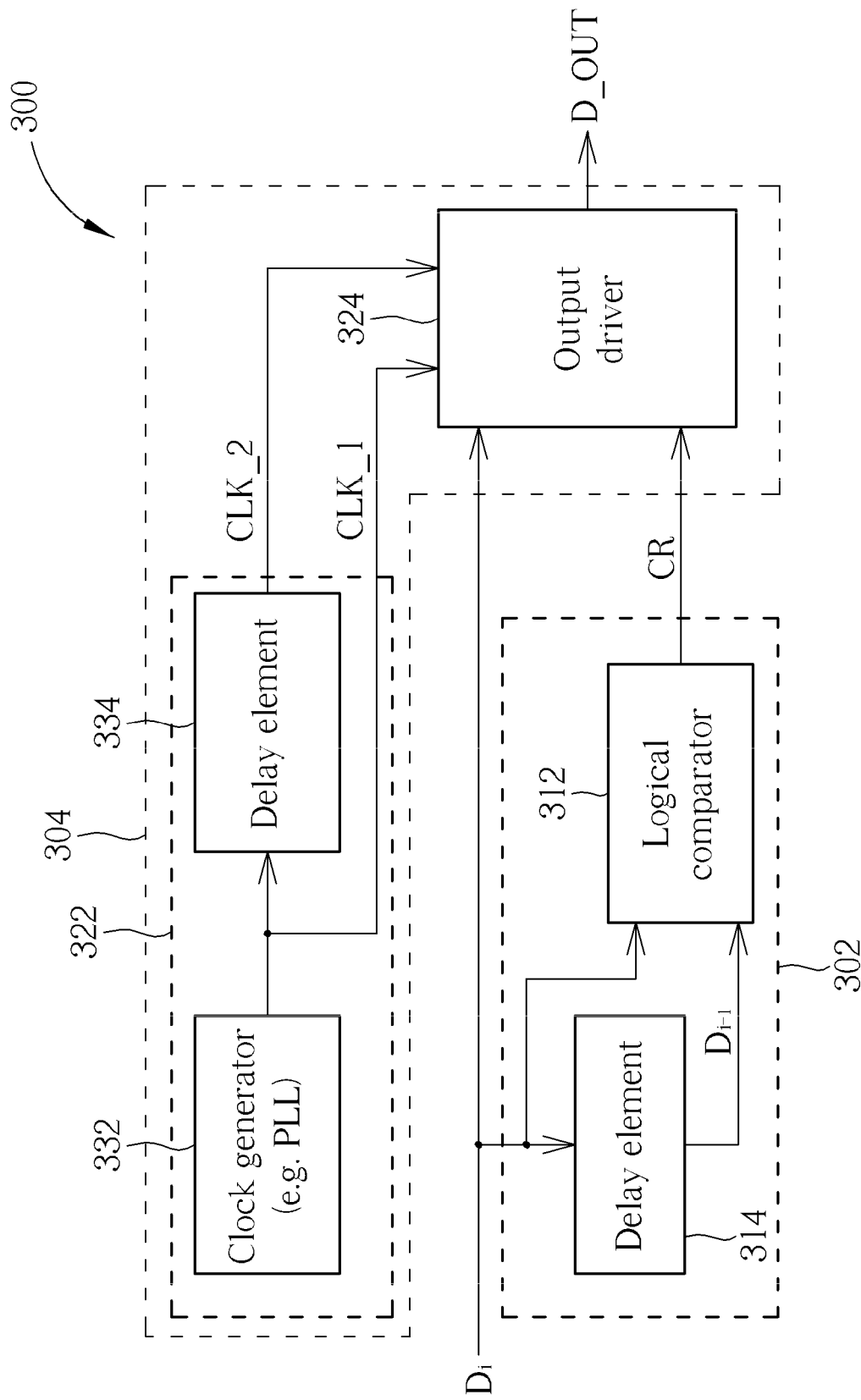
FIG. 3 is a diagram illustrating a signal transmitter according to a first exemplary embodiment of the present invention.

Please refer to FIG. 3, which is a diagram illustrating a signal transmitter according to a first exemplary embodiment of the present invention. The exemplary signal transmitter 300 includes, but is not limited to, a checking circuit 302 and a driving circuit 304. Regarding the checking circuit 302, it is arranged for checking a plurality of successive data bits to be transmitted (e.g., a current data bit $D_i$ that is not transmitted yet and a previous data bit $D_{i-1}$ that has been transmitted) and accordingly generating a checking result CR. Regarding the driving circuit 304, it is arranged for referring to the checking result CR and transmitting a specific data bit (e.g., data bit $D_i$) with a plurality of different predetermined voltage levels (e.g., the nominal voltage level V1 and the boosted voltage level V1', or the nominal voltage level V0 and the degraded voltage level V0'). More specifically, when the checking result CR indicates that transmission of the specific data bit should be compensated to alleviate the signal attenuation/loss caused by the transmission medium between the signal transmitter 300 and a signal receiver (not shown), the driving circuit 304 outputs different predetermined voltage levels to thereby apply the desired compensation to the transmission of the specific data bit. In a case where the aforementioned second compensation scheme is employed by the signal transmitter 300, the transmitter output D_OUT may have the waveform of the transmitter output $D\_OUT_2$ shown in FIG. 2.

In this exemplary embodiment, the checking circuit 302 includes a processing element (e.g., a logical comparator 312) and a delay element 314. The logical comparator 312 is arranged for generating the checking result CR according to the current data bit $D_i$ and the previous data bit $D_{i-1}$. More specifically, the logical comparator 312 compares binary values of the current data bit $D_i$ and the previous data bit $D_{i-1}$, and generates a comparing result as the checking result CR. As the previous data bit $D_{i-1}$ is transmitted before the current data bit $D_i$, the delay element 314 is purposely implemented for delaying the previous data bit $D_{i-1}$ such that the delay element 314 provides the previous data bit $D_{i-1}$ to the logical comparator 312 while the current data bit $D_i$ is inputted to the logical comparator 312. For example, the delay amount applied to the previous data bit $D_{i-1}$ by the delay element 314 is set by one bit time P1 shown in FIG. 2.

The logical comparator 312 is used to identify occurrence of a transition edge (i.e., a level transition from one logic level to another logic level). Thus, when the current data bit $D_i$ and the previous data bit $D_{i-1}$ have different binary values, implying that there is a transition edge between data bits $D_i$ and $D_{i+1}$, the logical comparator 312 would inform the driving circuit 304 of the transition edge by the checking result CR. Referring to the example shown in FIG. 2, one transition edge is identified by the logical comparator when $D_i=D_1$ and $D_{i-1}=D_0$, another transition edge is identified by the logical comparator when $D_i=D_3$ and $D_{i-1}=D_2$, and yet another transition edge is identified by the logical comparator when $D_i=D_6$ and $D_{i-1}=D_5$.

The driving circuit 304 includes a clock generating block 322 and an output driver 324. The clock generating block 322 is arranged for generating a plurality of clock signals (e.g., CLK_1 and CLK_2). The clock signals have the same frequency but different phases, and a frequency of each of the clock signals is equal to a bit rate of data bits transmitted from the signal transmitter 300. The output driver 324 is arranged for outputting the different predetermined voltage levels according to the specific data bit, the checking result and the clock signals, thus making the transmitted specific data bit (e.g., the data bit $D_i$ which is $D_1$, $D_3$ or $D_6$ shown in FIG. 2) have different predetermined voltage levels. In this exemplary embodiment, the clock generating block 322 includes a clock generator 332 and a delay element 334. By way of example, but not limitation, the clock generating block 322 may be implemented by a phase-locked loop (PLL) that is used to generate a reference clock signal as one clock signal CLK_1. Regarding the delay element 334, it delays the reference clock signal to output a delayed reference clock signal as the other clock signal CLK_2. For example, the delay amount applied to the reference clock signal by the delay amount 334 is set by one time period P2 shown in FIG. 2. In this way, the rising edge of the clock signal CLK_1 may define the start time of the boosted/degraded voltage level, and the rising edge of the clock signal CLK_2 may define the end time of the boosted/degraded voltage level. Thus, based on the timing control offered by the clock signals CLK_1 and CLK_2 and the compensation enabling control offered by the checking result DR, the output driver 324 would generate a transmitter output D_OUT with the waveform of the transmitter output $D\_OUT_2$ shown in FIG. 2 when transmitting a bit sequence "01100011" to the signal receiver.

Figure 4:
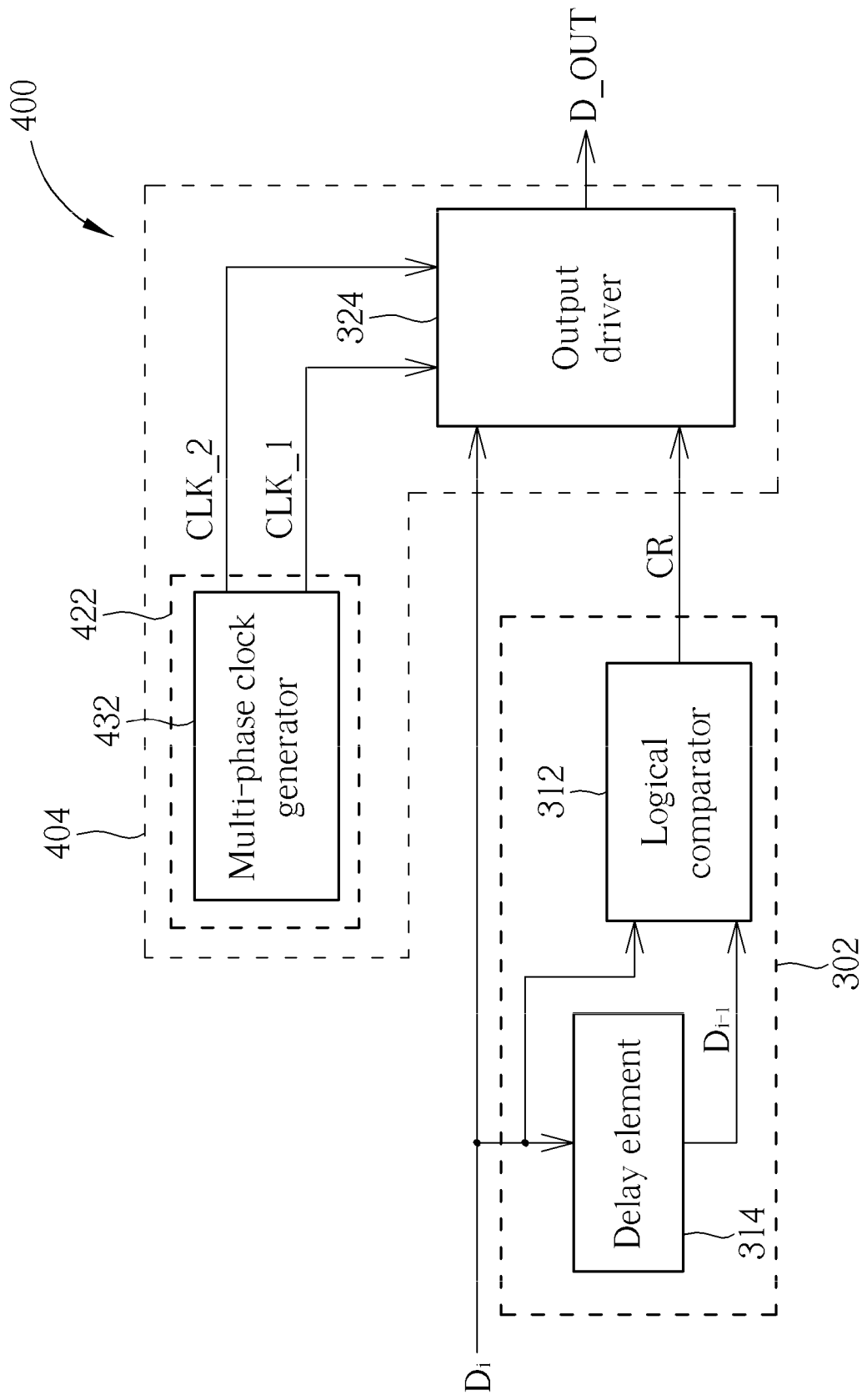
FIG. 4 is a diagram illustrating a signal transmitter according to a second exemplary embodiment of the present invention.

In the exemplary embodiment shown in FIG. 3, the clock signals CLK_1 and CLK_2 are generated by a combination of one clock generator 332 and one delay element 334. However, this is for illustrative purposes only, and is not meant to be a limitation of the present invention. Any circuit capable of providing the clocks needed by the output driver 324 may be employed by the signal transmitter 300. Please refer to FIG. 4, which is a diagram illustrating a signal transmitter according to a second exemplary embodiment of the present invention. The major difference between the signal transmitters 300 and 400 is that the clock generating block 422 of the driving circuit 404 employs a multi-phase clock generator (e.g., a multi-phase PLL) 432. The same objective of providing the desired clock signals CLK_1 and CLK_2 to the output driver 324 is achieved.

The aforementioned checking circuit 302 concurrently checks two successive data bits, including the current data bit $D_i$ and the previous data bit $D_{i-1}$, to determine if a transition edge occurs. When the transition edge is detected by the checking circuit 302, the driving circuit 304/404 is operative to apply compensation to the transmission of the current data bit $D_i$ by using different predetermined voltage levels such that the transmitted current data bit $D_i$ would have different predetermined voltage levels. That is, two successive data bits are checked to determine whether the transmission of the later data bit (i.e., the current data bit) should be compensated. Alternatively, concurrently checking more than two successive data bits to determine enabling of the transmission compensation of one or more checked data bits is feasible, thereby improving the compensation resolution. By way of example, but not limitation, 2*N successive data bits are checked to determine whether transmission of one or more of the later N data bits should be compensated and/or to determine the compensation manner of the transmission of one or more of the later N data bits. In such a case that if only N successive data bits can be checked each time, more memory space (amount reached to 2*N) are needed to store the 2*N successive data bits for fully check.

Figure 5:
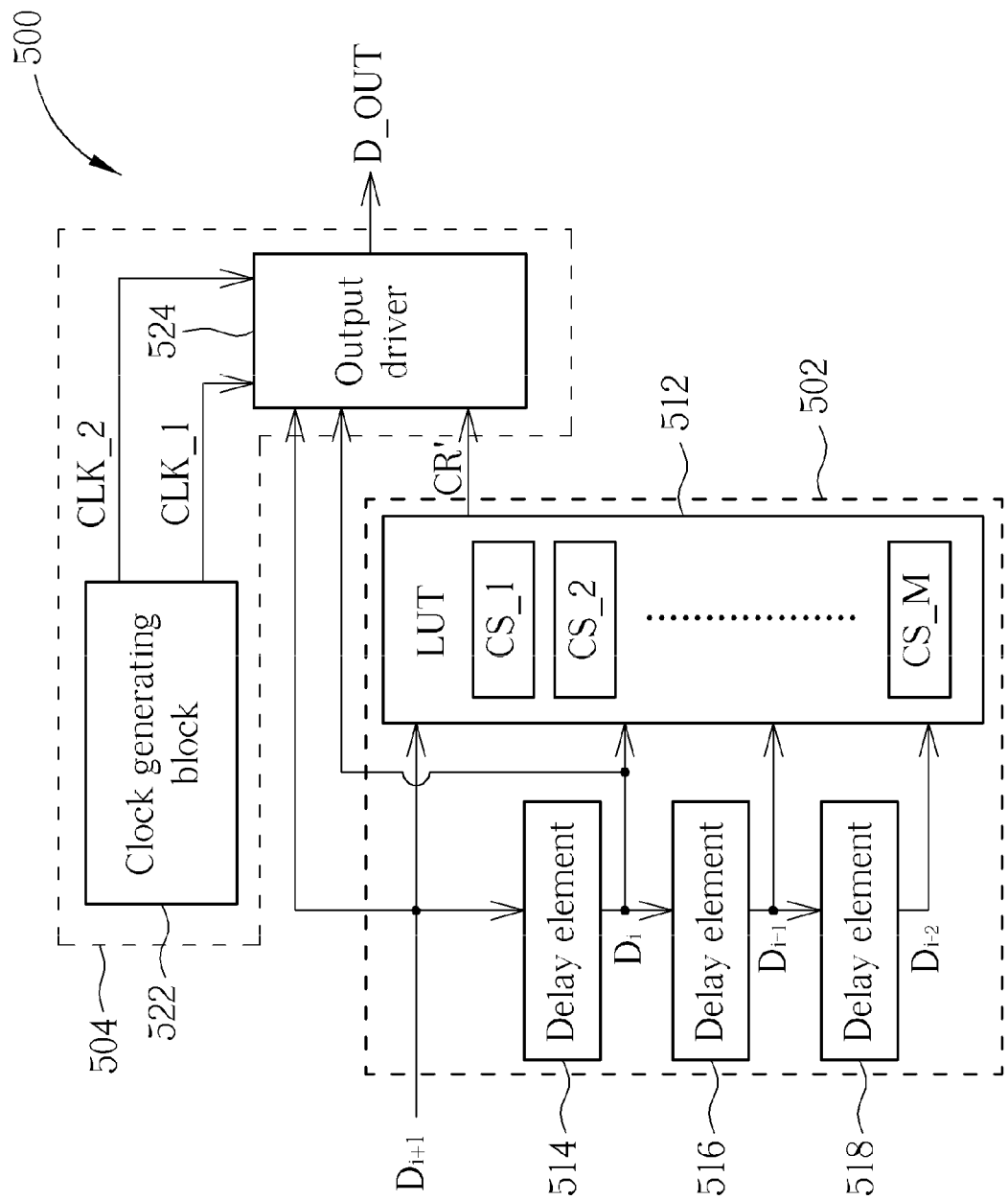
FIG. 5 is a diagram illustrating a signal transmitter according to a third exemplary embodiment of the present invention.

Please refer to FIG. 5, which is a diagram illustrating a signal transmitter according to a third exemplary embodiment of the present invention. The exemplary signal transmitter 500 includes, but is not limited to, a checking circuit 502 and a driving circuit 504. Regarding the checking circuit 502, it is arranged for concurrently checking more than two successive data bits to be transmitted (e.g., data bits $D_{i-2}$, $D_{i-1}$, $D_i$ and $D_{i+1}$) and accordingly generating a checking result CR'. Regarding the driving circuit 504, it is arranged for referring to the checking result CR' and transmitting a specific data bit with a plurality of different predetermined voltage levels (e.g., the nominal voltage level V1 and the boosted voltage level V1', or the nominal voltage level V0 and the degraded voltage level V0'). For example, when the checking result CR' indicates that the transmission of any of the data bits $D_i$ and $D_{i+1}$ should be compensated, the driving circuit 504 transmits each specific data bit whose transmission requires compensation by referring to the checking result CR' and transmits each specific data with different predetermined voltage levels.

In this exemplary embodiment, the checking circuit 502 includes a processing element (e.g., a look-up table (LUT) 512) and a plurality of delay elements 514, 516, 518. The LUT 512 is arranged for generating the checking result CR' according to more than two successive data bits. More specifically, the LUT 512 includes a plurality of predetermined control settings CS_1-CS_M respectively mapped to different combinations of binary values, and is arranged for outputting one of the predetermined control settings CS_1-CS_M as the checking result CR' according to a combination of binary values of the checked data bits $D_{i-2}$, $D_{i-1}$, $D_i$, and $D_{i+1}$. For example, when data bits $D_{i-2}$, $D_{i-1}$, $D_i$, and $D_{i+1}$ have the same binary value (e.g., $D_{i-2}D_{i-1}D_iD_{i+1}$="0000" or $D_{i-2}D_{i-1}D_iD_{i+1}$="1111", the checking result CR' generated from the LUT 512 would indicate that no compensation is needed. When the data bits $D_{i-2}$, $D_{i-1}$, $D_i$, and $D_{i+1}$ have different binary values, the checking result CR' generated from the LUT 512 depends upon the distribution of binary values "0" and "1".

The checking result CR' may indicate whether transmission of a specific data bit should be compensated. In addition, the checking result CR' may also indicate how to perform the needed compensation when the transmission of the specific data bit should be compensated. For example, the difference between the nominal voltage level V0 and the degraded voltage level V0' and the difference between the nominal voltage level V1 and the boosted voltage level V1' are not fixed. Hence, the predetermined control settings CS_1-CS_M may include different degraded/boosted voltage level settings.

As the data bits $D_{i-2}$, $D_{i-1}$ and $D_i$ are sequentially transmitted before the data bit $D_{i+1}$, the delay elements 514-518 are purposely implemented for delaying the data bits $D_{i-2}$, $D_{i-1}$ and $D_i$ such that the delay elements 514-518 provide the data bits $D_{i-2}$, $D_{i-1}$ and $D_i$ to the LUT 512 while the data bit $D_{i+1}$ is inputted to the LUT 512. For example, the delay amount applied to data bits $D_{i-2}$, $D_{i-1}$ and $D_i$ by respective delay elements 514-518 is set by one bit time P1 shown in FIG. 2.

Figure 6:
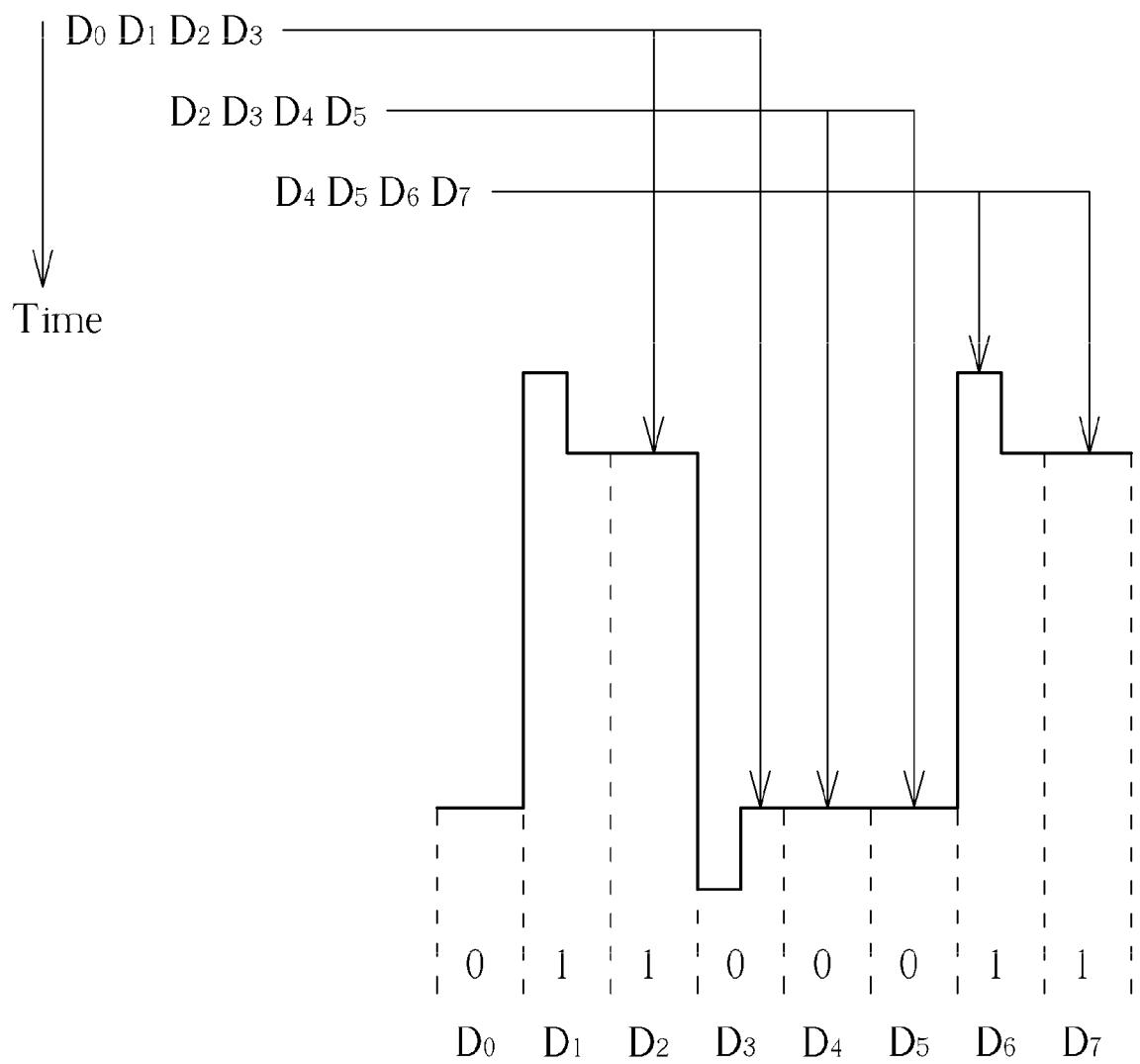
FIG. 6 is a diagram illustrating an exemplary operation of the signal transmitter shown in FIG. 5.

The driving circuit 504 includes a clock generating block 522 and an output driver 524. The clock generating block 522 may be implemented using one of the above-mentioned clock generating blocks 322 and 422. Thus, the clock generating block 522 generates a plurality of clock signals (e.g., CLK_1 and CLK_2), wherein the clock signals have a same frequency but different phases, and the frequency of each of the clock signals is equal to a bit rate of data bits transmitted from the signal transmitter 500. In this exemplary embodiment, the checking result CR' determined by binary values of the data bits $D_{i-2}$, $D_{i-1}$ $D_i$, and $D_{i+1}$ are used to control whether the compensation should be applied to one or both of the data bits $D_i$ and $D_{i+1}$. Thus, when the checking result CR' indicates that transmission of a specific data bit should be compensated, the output driver 524 transmits the specific data bit with different predetermined voltage levels according to the specific data bit, the checking result and the clock signals. The next checking operation would shift the checked data bits (e.g., $D_{i-2}$, $D_{i-1}$, $D_i$, and $D_{i+1}$) by two bits to thereby replace the former two checked data bits (e.g., $D_{i-2}$ and $D_{i-1}$) with the later two checked data bits (e.g., $D_i$ and $D_{i+1}$) and further include two new data bits (e.g., $D_{i+2}$ and $D_{i+3}$) following the later two checked data bits (e.g., $D_i$ and $D_{i+1}$). For better understanding of the checking operation, please refer to FIG. 6. FIG. 6 is a diagram illustrating an exemplary operation of the signal transmitter 500 shown in FIG. 5. As shown in FIG. 6, data bits $D_0$-$D_3$ are checked to determine the voltage output of the data bits $D_2$ and $D_3$; data bits $D_2$-$D_5$ are checked to determine the voltage output of the data bits $D_4$ and $D_5$; and data bits $D_4$-$D_7$ are checked to determine the voltage output of the data bits $D_6$ and $D_7$.

In the exemplary embodiment shown in FIG. 5, four successive data bits $D_{i-2}$, $D_{i-1}$, $D_i$, $D_{i+1}$ are concurrently checked by the checking circuit 502. However, the number of checked data bits is not limited to four, and may be adjusted according to actual design consideration. Besides, checking four successive data bits $D_{i-2}$, $D_{i-1}$, $D_i$, $D_{i+1}$ to determine whether the transmission of two data bits $D_i$ and $D_{i+1}$ should be compensated and/or determine the compensation manner of two data bits $D_i$, $D_{i+1}$ is for illustrative purposes only. Specifically, the spirit of the present invention is obeyed as long as K successive data bits are checked to determine whether the transmission of L data bits included in the K successive data bits should be compensated and/or determine the compensation manner of the L data bits included in the K successive data bits, where K is a positive integer larger than two, and L is any positive integer smaller than K.

Figure 7:
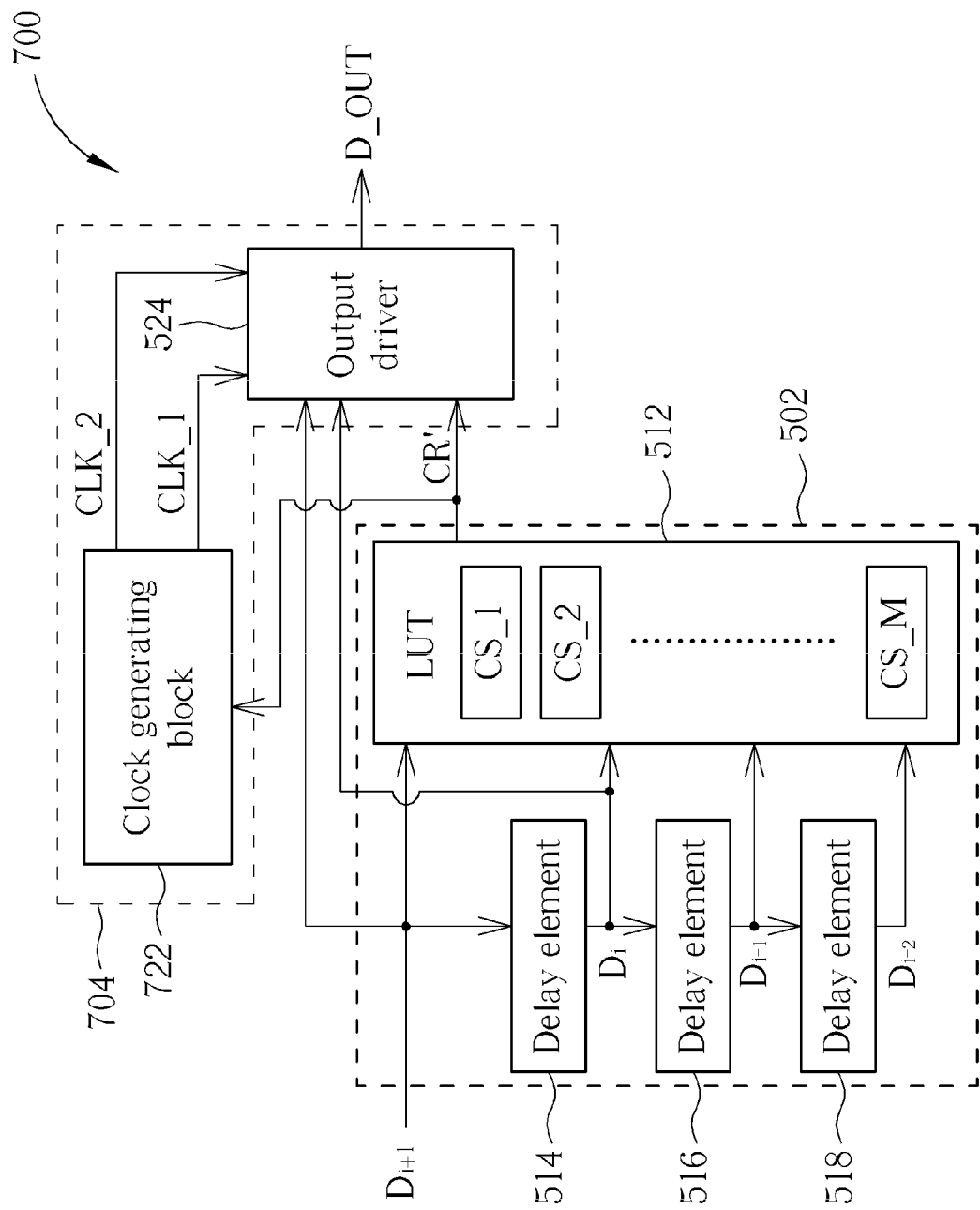
FIG. 7 is a diagram illustrating a signal transmitter according to a fourth exemplary embodiment of the present invention.

As mentioned above, the predetermined control settings CS_1-CS_M may include different degraded/boosted voltage level settings. In an alternative design, when the compensation for a specific data bit is performed, the degraded/boosted voltage level is not required to last during a fixed time period, say, P2. Hence, the predetermined control settings CS_1-CS_M may further include different time period settings of the degraded/boosted voltage level. Please refer to FIG. 7, which is a diagram illustrating a signal transmitter according to a fourth exemplary embodiment of the present invention. The major difference between the signal transmitters 500 and 700 is that the clock generating block 722 of the driving circuit 704 receives the checking result CR', and generates the clock signals CLK_1 and CLK_2 according to the checking result CR'. That is, the phase relationship of the clock signals CLK_1 and CLK_2 may be adjusted according to the checking result CR'. In this way, the time period P2 shown in FIG. 2 is not a fixed value, and may be dynamically adjusted for achieving optimized signal transmission quality.

It should be noted that the operation of generating the checking result CR' by checking more than two successive data bits is not restricted to collaborating with the above-mentioned second compensation scheme which uses a boosted/degraded voltage level within a time period shorter than one bit time. For example, the operation of generating the checking result CR' by checking more than two successive data bits may collaborate with the above-mentioned first compensation scheme of using a boosted/degraded voltage level that lasts for one bit time. The same objective of improving the compensation resolution is achieved.

Figure 8:
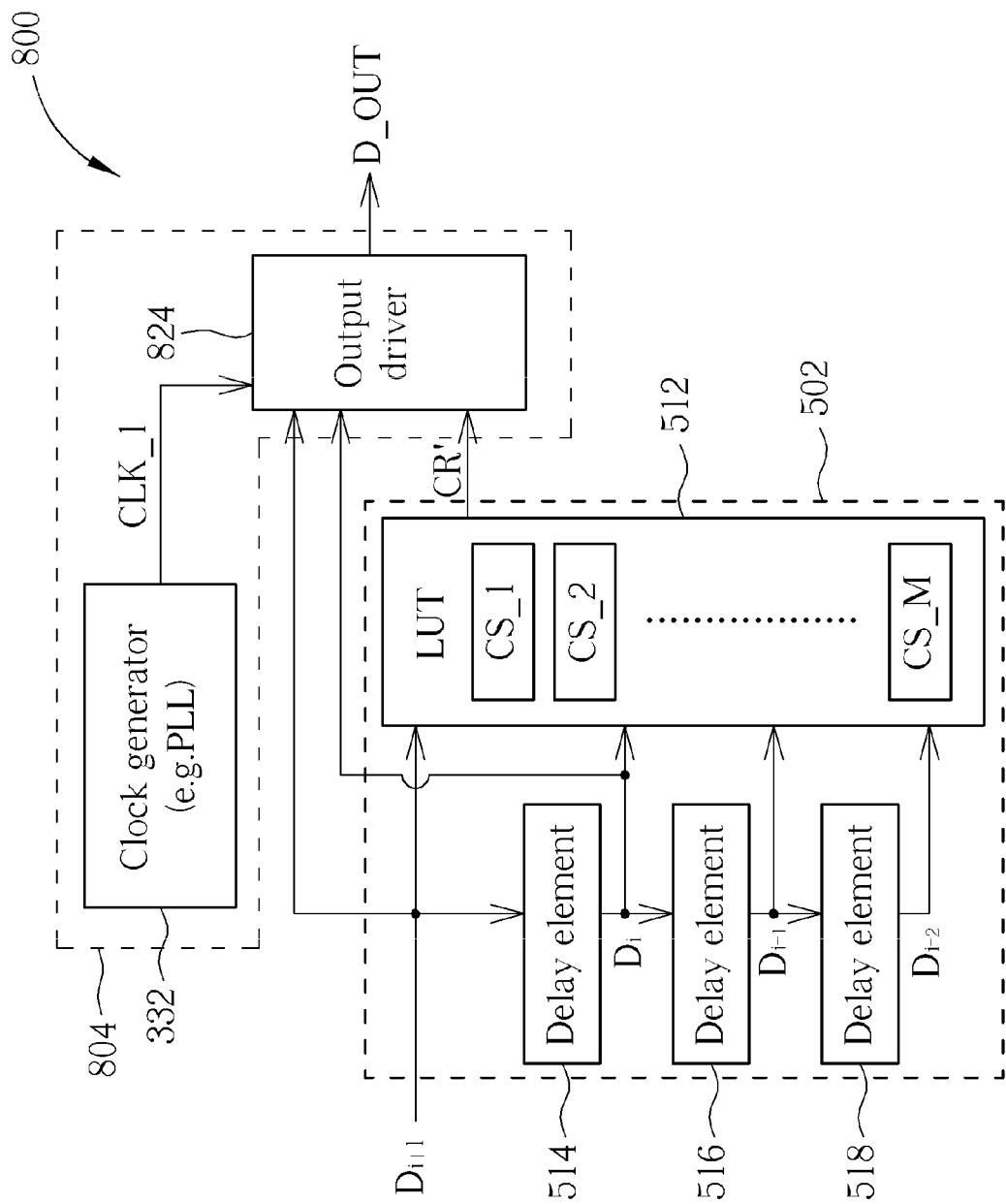
FIG. 8 is a diagram illustrating a signal transmitter according to a fifth exemplary embodiment of the present invention.
Figure 9:
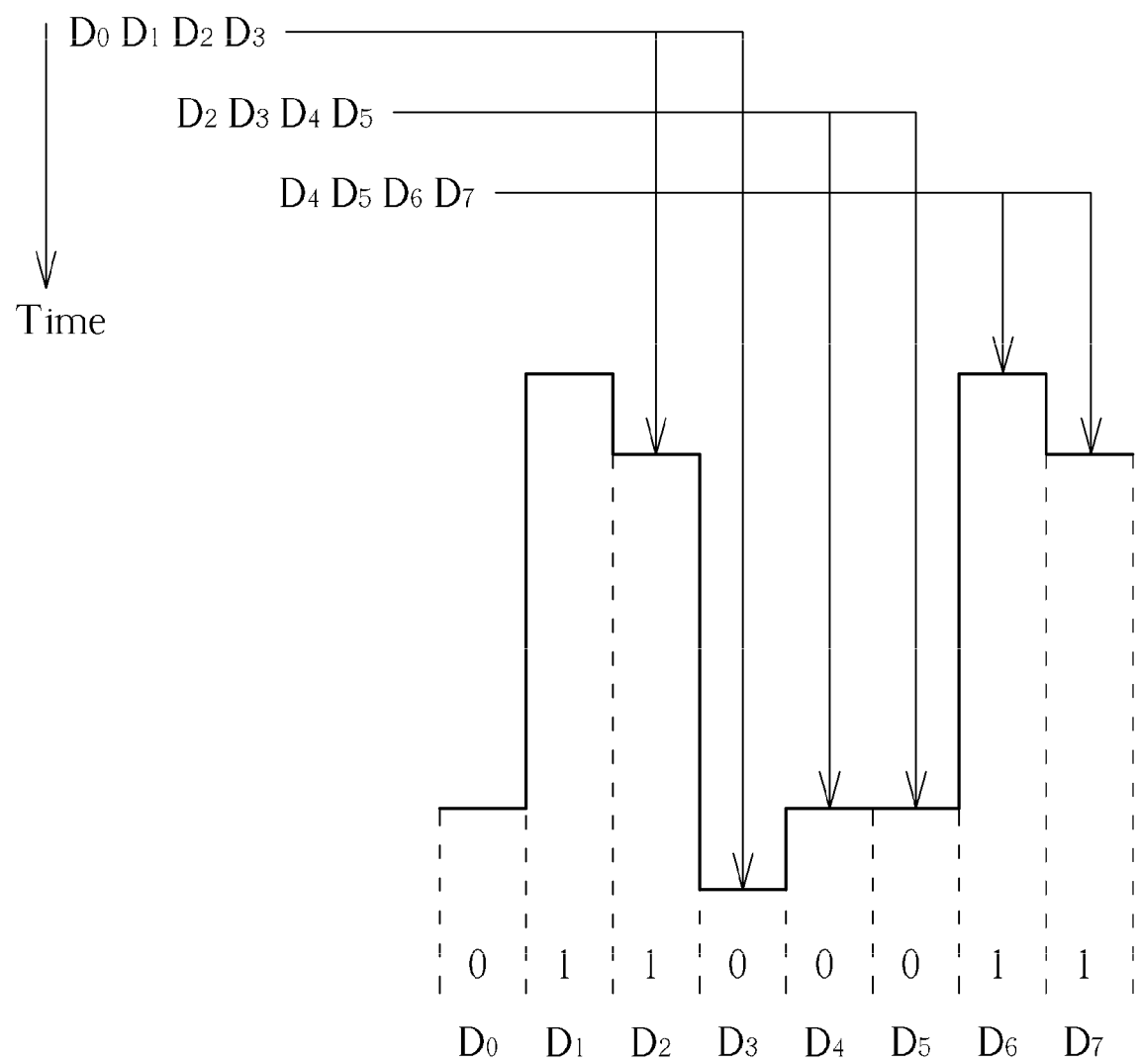
FIG. 9 is a diagram illustrating an exemplary operation of the signal transmitter shown in FIG. 8.

Please refer to FIG. 8, which is a diagram illustrating a signal transmitter according to a fifth exemplary embodiment of the present invention. The major difference between the signal transmitters 700 and 800 is that the driving circuit 804 includes a clock generating block implemented by the aforementioned clock generator 332 that provides the clock signal CLK1 whose frequency is identical to the data rate of data bits transmitted from the signal transmitter 800. When the compensation is enabled by the output driver 824 for a specific data bit, the output driver 824 would sustain the boosted/degraded voltage level during a time period equal to one bit time. Please refer to FIG. 9, which is a diagram illustrating an exemplary operation of the signal transmitter 800 shown in FIG. 8. As shown in FIG. 9, data bits $D_0$-$D_3$ are checked to determine the voltage output of the data bits $D_2$ and $D_3$; data bits $D_2$-$D_5$ are checked to determine the voltage output of the data bits $D_4$ and $D_5$; and data bits $D_4$-$D_7$ are checked to determine the voltage output of the data bits $D_6$ and $D_7$.

Please note that the waveform of the transmitter output D_OUT shown in each of FIG. 6 and FIG. 9 is an example that illustrates the compensation that is controlled by the comparing result CR' derived from checking more than two successive data bits. Actually, the waveform of the transmitter output D_OUT generated from the output driver 524/824 depends on the design of the control settings CS_1-CS_M of the LUT 512. Moreover, using a look-up table to realize the processing element in the checking circuit 502 is also one feasible implementation of the present invention. Alternatively, the LUT 512 may be replaced by a processor which executes a program to determine the checking result CR' based on processing of the received data bits $D_{i-1}$, $D_{i-1}$, $D_i$, and $D_{i+1}$.

The second compensation scheme shown in FIG. 2 is used for applying compensation to the transmission of the high-frequency component (e.g., the transition edge between two successive data bits with different binary values) with transmission of the low-frequency component kept intact. Specifically, different predetermined voltage levels used for transmitting a specific data bit having a binary value equal to one (e.g., $D_1$ or $D_6$) includes a nominal voltage level V1 designated for transmission of the specific data bit and a boosted voltage level V1' higher than the nominal voltage level V1, where the driving circuit of the proposed signal transmitter would output the boosted voltage level V1' prior to outputting the nominal voltage level V1. In addition, different predetermined voltage levels used for transmitting a specific data bit having a binary value equal to zero (e.g., $D_3$) includes a nominal voltage level V0 designated for transmission of the specific data bit and a degraded voltage level V0' lower than the nominal voltage level V0, where the driving circuit of the proposed signal transmitter would output the degraded voltage level V0' prior to outputting the nominal voltage level V0. However, with regard to compensation of the transmission of a specific data bit having the binary value equal to one, the effect resulting from pre-emphasizing (boosting/enhancing) the high-frequency component without changing the following low-frequency component may be similar to the effect resulting from de-emphasizing (degrading/attenuating) the low-frequency component without changing the preceding high-frequency component. Similarly, with regard to compensation of the transmission of a specific data bit having the binary value equal to zero, the effect resulting from de-emphasizing (degrading/attenuating) the high-frequency component without changing the following low-frequency component may be similar to the effect resulting from pre-emphasizing (boosting/enhancing) the low-frequency component without changing the preceding high-frequency component.

Figure 10:
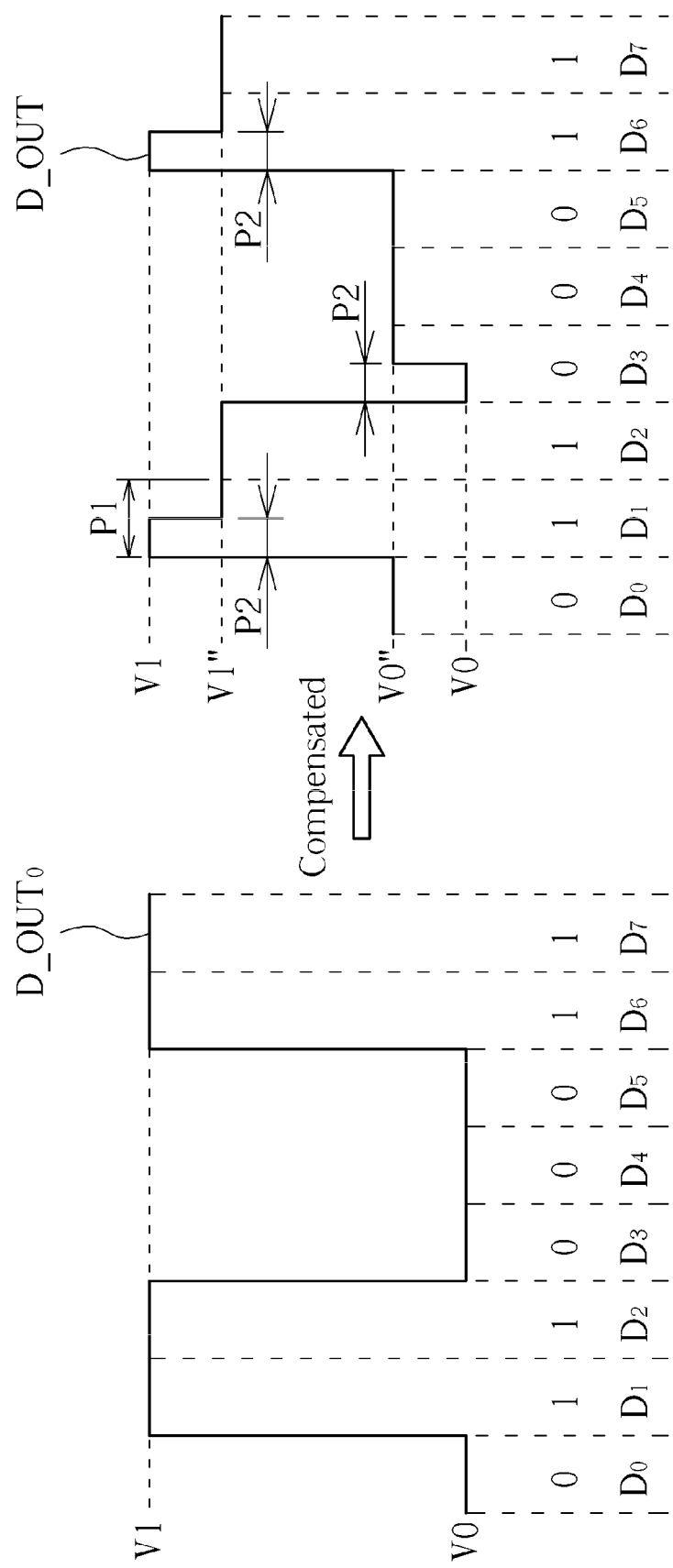
FIG. 10 is a diagram illustrating a transmitter output generated by a third compensation scheme according to an exemplary embodiment of the present invention.

Please refer to FIG. 10, which is a diagram illustrating a transmitter output generated by a third compensation scheme according to an exemplary embodiment of the present invention. The signal transmitter 300/400/500/700 employing the third compensation scheme would transmit data bits $D_1$ and $D_6$ each having a plurality of different predetermined voltage levels, such as one nominal voltage level V1 and one degraded voltage level V1", and transmit the data bit $D_3$ having a plurality of different predetermined voltage levels, such as one nominal voltage level V0 and one boosted voltage level V0".

Hence, when the signal transmitter 300/400/500/700 transmits a bit sequence $D_0D_1D_2D_3D_4D_5D_6D_7$="01100011", the transmitter output D_OUT would have the exemplary voltage waveform as shown in FIG. 10. The driving circuit of the signal transmitter 300/400/500/700 would output the nominal voltage level V1 prior to outputting the degraded voltage level V1" lower than the nominal voltage level V1, and output the nominal voltage level V0 prior to outputting the boosted voltage level V0" higher than the nominal voltage level V0. Besides, the boosted voltage level V0"/degraded voltage level V1" would last during a time period P2 which is shorter than one bit time P1. The implementation of the third compensation scheme is also not required to follow the data rate of data bits transmitted from the signal transmitter 300/400/500/700. The same objective of providing compensation to the high-frequency component is achieved.

When the transition edge between two successive data bits is detected, the aforementioned second compensation scheme shown in FIG. 2 applies compensation to the transmission of the later data bit with the transmission of the former data bit remained intact. However, with a proper buffer design added to the proposed signal transmitter, applying compensation to transmission of the former data bit upon detection of the transition edge is also feasible.

Figure 11:
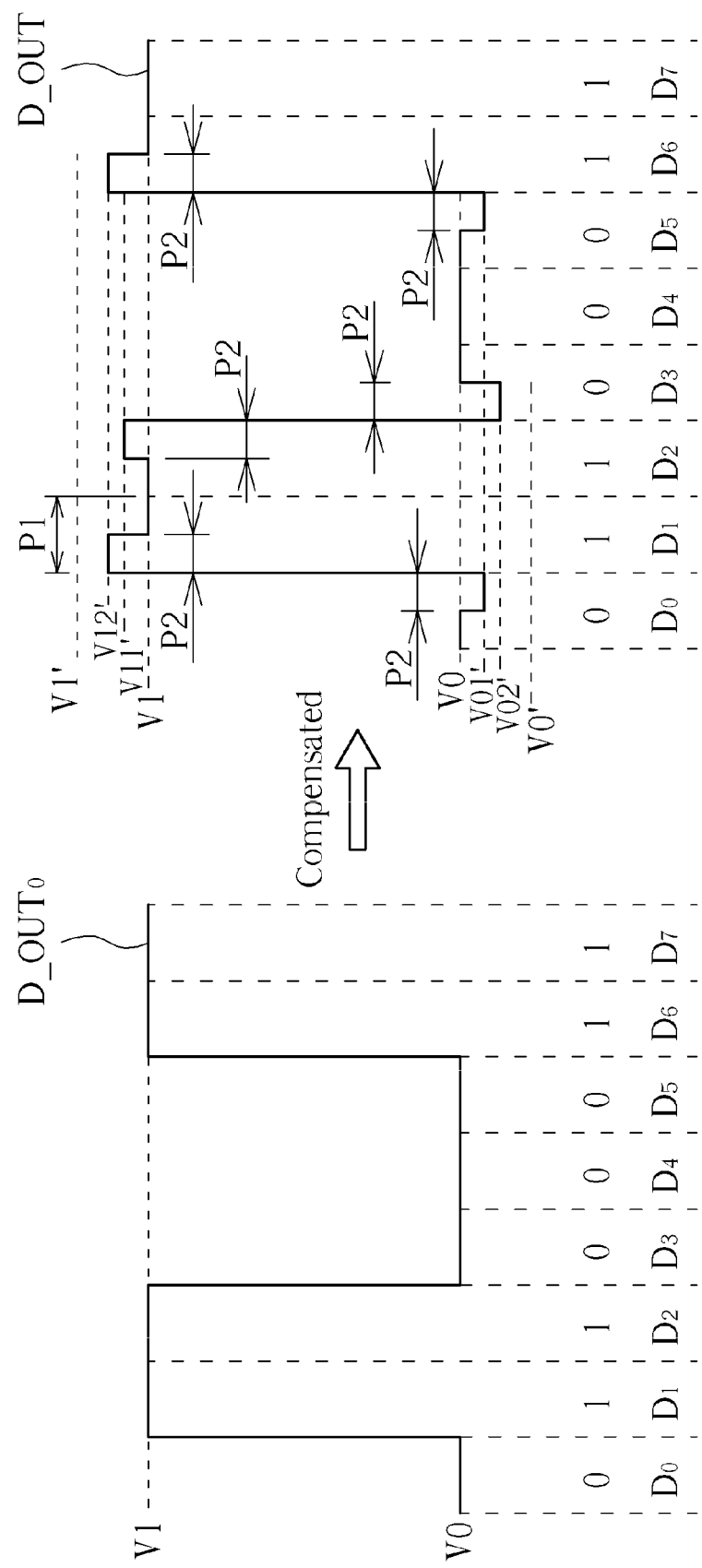
FIG. 11 is a diagram illustrating a transmitter output generated by a fourth compensation scheme according to an exemplary embodiment of the present invention.

Please refer to FIG. 11, which is a diagram illustrating a transmitter output generated by a fourth compensation scheme according to an exemplary embodiment of the present invention. The signal transmitter 300/400/500/700 employing the fourth compensation scheme would transmit data bits $D_1$ and $D_6$ each having a plurality of different predetermined voltage levels, such as one nominal voltage level V1 and one boosted voltage level V12'; transmit the data bit $D_3$ having use a plurality of different predetermined voltage levels, such as one nominal voltage level V0 and one degraded voltage level V02'; transmit the data bit $D_2$ having a plurality of different predetermined voltage levels, such as one nominal voltage level V1 and one boosted voltage level V11'; and transmit data bits $D_0$ and $D_5$ each having a plurality of different predetermined voltage levels, such as one nominal voltage level V1 and one degraded voltage level V01'. Hence, when the signal transmitter 300/400/500/700 transmits a bit sequence $D_0D_1D_2D_3D_4D_5D_6D_7$="01100011", the transmitter output D_OUT would have the exemplary voltage waveform as shown in FIG. 11. It should be noted that V12' is lower than V1', V11' is higher than V1, V01' is lower than V0 and V0' is lower than V02'. The implementation of the forth compensation scheme is also not required to follow the data rate of data bits transmitted from the signal transmitter 300/400/500/700. The same objective of providing compensation to the high-frequency component is achieved.

Similarly, the aforementioned third compensation scheme shown in FIG. 10 may be modified to support the technical feature of applying compensation to transmission of the former data bit upon detection of the transition edge. As a person skilled in the art can readily understand details of such a modification made to the aforementioned third compensation scheme after reading above paragraphs, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal transmitter, comprising:
  a checking circuit, arranged for checking a plurality of successive data bits to be transmitted and accordingly generating a checking result, wherein the plurality of successive data bits are compared to detect occurrence of a transition edge; and
  a driving circuit, arranged for referring to the checking result and transmitting a specific data bit with a plurality of different predetermined voltage levels, wherein the different predetermined voltage levels are successively outputted from the driving circuit;
  wherein when the specific data bit has a binary value equal to zero, the different predetermined voltage levels include at least a first nominal voltage level designated for transmitting the specific data bit and a boosted voltage level higher than the first nominal voltage level, and the driving circuit applies compensation to transmission of the specific data bit by outputting the first nominal voltage level prior to outputting the boosted voltage level; and
  wherein when the specific data bit has a binary value equal to one, the different predetermined voltage levels include at least a second nominal voltage level designated for transmitting the specific data bit and a degraded voltage level lower than the second nominal voltage level, and the driving circuit applies compensation to transmission of the specific data bit by outputting the second nominal voltage level prior to outputting the degraded voltage level.

2. The signal transmitter of claim 1, wherein the plurality of successive data bits include a first data bit and at least one second data bit preceding the first data bit; and the checking circuit comprises:
  a processing element, arranged for generating the checking result according to the first data bit and at least one delayed second data bit; and
  at least one delay element, arranged for delaying the at least one second data bit, and outputting the at least one second data bit to the processing element.

3. The signal transmitter of claim 2, wherein a number of the plurality of successive data bits is two such that the first data bit is a current data bit and the second data bit is a previous data bit; and the processing element is a logical comparator arranged for comparing binary values of the current data bit and the previous data bit and generating a comparing result as the checking result.

4. The signal transmitter of claim 2, wherein a number of the plurality of successive data bits is larger than two; and the processing element is a look-up table having a plurality of predetermined control settings respectively mapped to different combinations of binary values, and is arranged for outputting one of the predetermined control settings as the checking result according to a combination of binary values of the first data bit and a plurality of second data bits preceding the first data bit.

5. The signal transmitter of claim 1, wherein the driving circuit comprises:
   a clock generating block, arranged for generating a plurality of clock signals having different phases, wherein a frequency of each of the clock signals is equal to a bit rate of data bits to be transmitted; and
   an output driver, arranged for transmitting the specific data bit with the different predetermined voltage levels according to the specific data bit, the checking result and the clock signals.

6. The signal transmitter of claim 5, wherein the clock generating block generates the clock signals according to the checking result.

7. The signal transmitter of claim 5, wherein the clock generating block comprises:
   a clock generator, arranged for generating a reference clock signal; and
   a delay element, arranged for delaying the reference clock signal to output a delayed reference clock signal, wherein the clock signals include the reference clock signal and the delayed reference clock signal.

8. The signal transmitter of claim 5, wherein the clock generating block comprises a multi-phase clock generator arranged for generating the clock signals.

9. The signal transmitter of claim 1, wherein regarding each transition edge detected between two of the plurality of successive data bits, the driving circuit is arranged to apply compensation to transmission of each data bit of the two of the plurality of successive data bits to transmit the data bit by successively outputting different voltage levels.

10. A signal transmitting method, comprising:
    checking a plurality of successive data bits to be transmitted, and accordingly generating a checking result, wherein the plurality of successive data bits are compared to detect occurrence of a transition edge; and
    transmitting a specific data bit with a plurality of different predetermined voltage levels according to the checking result, wherein the different predetermined voltage levels are successively outputted;
    wherein when the specific data bit has a binary value equal to zero, the different predetermined voltage levels include at least a first nominal voltage level designated for transmitting the specific data bit and a boosted voltage level higher than the first nominal voltage level, and the step of transmitting the specific data bit with the different predetermined voltage levels comprises: applying compensation to transmission of the specific data bit by outputting the first nominal voltage level prior to outputting the boosted voltage level; and
    wherein when the specific data bit has a binary value equal to one, the different predetermined voltage levels include at least a second nominal voltage level designated for transmitting the specific data bit and a degraded voltage level lower than the second nominal voltage level, and the step of transmitting the specific data bit with the different predetermined voltage levels comprises: applying compensation to transmission of the specific data bit by outputting the second nominal voltage level prior to outputting the degraded voltage level.

11. The signal transmitting method of claim 10, wherein the plurality of successive data bits include a first data bit and at least one second data bit preceding the first data bit; and the step of checking the plurality of successive data bits comprises:
    delaying the at least one second data bit to output at least one delayed second data bit; and
    generating the checking result according to the first data bit and the at least one delayed second data bit.

12. The signal transmitting method of claim 11, wherein a number of the plurality of successive data bits is two such that the first data bit is a current data bit and the second data bit is a previous data bit; and the step of generating the checking result according to the first data bit and the at least one delayed second data bit comprises:
    comparing binary values of the current data bit and the previous data bit, and generating a comparing result as the checking result.

13. The signal transmitting method of claim 11, wherein a number of the plurality of successive data bits is larger than two; and the step of generating the checking result according to the first data bit and the at least one delayed second data bit comprises:
    searching a look-up table having a plurality of predetermined control settings respectively mapped to different combinations of binary values according to a combination of binary values of the first data bit and a plurality of second data bits preceding the first data bit, and accordingly outputting one of the predetermined control settings as the checking result.

14. The signal transmitting method of claim 10, wherein the step of transmitting the specific data bit with the different predetermined voltage levels comprises:
    generating a plurality of clock signals having different phases, wherein a frequency of each of the clock signals is equal to a bit rate of data bits to be transmitted; and
    transmitting the specific data bit with the different predetermined voltage according to the specific data bit, the checking result and the clock signals.

15. The signal transmitting method of claim 14, wherein the step of generating the clock signals comprises:
    generating the clock signals according to the checking result.

16. The signal transmitting method of claim 14, wherein the step of generating the clock signals comprises:
    generating a reference clock signal; and
    delaying the reference clock signal to output a delayed reference clock signal, wherein the clock signals include the reference clock signal and the delayed reference clock signal.

17. The signal transmitting method of claim 14, wherein the step of generating the clock signals comprises:
    utilizing a multi-phase clock generator to generate the clock signals.

18. The signal transmitting method of claim 10, wherein regarding each transition edge detected between two of the plurality of successive data bits, compensation is applied to transmission of each data bit of the of plurality of successive data bits to transmit the data bit by successively outputting different voltage levels.

19. A signal transmitter, comprising:
    a checking circuit, arranged for concurrently checking a plurality of successive data bits to be transmitted and accordingly generating a checking result, wherein a number of the plurality of successive data bits is larger than two; and
    a driving circuit, arranged for referring to the checking result to perform transmission compensation for at least a specific data bit of the plurality of successive data bits and transmitting the specific data bit with a specific voltage level, wherein the specific voltage level is different from a nominal voltage level for transmission of the specific data bit;

wherein each of the plurality of successive data bits checked by the checking circuit has a binary value, wherein when the checking circuit is checking the plurality of successive data bits concurrently, each of the plurality of successive data bits checked by the checking circuit has a binary value that is not affected by the transmission compensation performed by the driving circuit.

20. The signal transmitter of claim 19, wherein the plurality of successive data bits include a first data bit and a plurality of second data bits preceding the first data bit; and the checking circuit comprises:

a look-up table, having a plurality of predetermined control settings respectively mapped to different combinations of binary values, wherein the look-up table is arranged for outputting one of the predetermined control settings as the checking result according to a combination of binary values of the first data bit and a plurality of second data bits preceding the first data bit; and a plurality of delay elements, arranged for delaying the second data bits, wherein the delay elements provide the second data bits to the look-up table while the first data bit is inputted to the look-up table.

\* \* \* \* \*